US012550885B2

(12) United States Patent
Hoehn et al.

(10) Patent No.: US 12,550,885 B2
(45) Date of Patent: Feb. 17, 2026

(54) RED BLOOD CELL STORAGE SOLUTIONS, SOLUTION ADDITIVES, AND METHODS FOR IMPROVING THE STORAGE OF RED BLOOD CELLS

(71) Applicant: University of Cincinnati, Cincinnati, OH (US)

(72) Inventors: Richard S. Hoehn, Cincinnati, OH (US); Peter L. Jernigan, Cincinnati, OH (US); Alex L. Chang, Cincinnati, OH (US); Charles C. Caldwell, Cincinnati, OH (US); Alex B. Lentsch, Cincinnati, OH (US); Michael J. Edwards, Cincinnati, OH (US); Erich Gulbins, Cincinnati, OH (US); Timothy A. Pritts, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 1033 days.

(21) Appl. No.: 17/212,296

(22) Filed: Mar. 25, 2021

(65) Prior Publication Data

US 2021/0235686 A1 Aug. 5, 2021

Related U.S. Application Data

(62) Division of application No. 15/490,068, filed on Apr. 18, 2017, now abandoned.

(60) Provisional application No. 62/323,837, filed on Apr. 18, 2016.

(51) Int. Cl.
| | |
|---|---|
| *A01N 1/02* | (2006.01) |
| *A01N 1/10* | (2025.01) |
| *A01N 1/122* | (2025.01) |
| *A01N 1/126* | (2025.01) |
| *A61K 40/10* | (2025.01) |
| *A61K 40/40* | (2025.01) |
| *C12N 5/078* | (2010.01) |

(52) U.S. Cl.
CPC ............ *A01N 1/10* (2025.01); *A01N 1/122* (2025.01); *A01N 1/126* (2025.01); *A61K 40/10* (2025.01); *A61K 40/40* (2025.01); *C12N 5/0634* (2013.01); *A61K 2239/31* (2023.05); *A61K 2239/38* (2023.05)

(58) Field of Classification Search
CPC ........ A01N 1/02; A01N 1/021; A01N 1/0226; C12N 5/0634
See application file for complete search history.

(56) References Cited

PUBLICATIONS

Miller et al., Pulmonary Complications of Sickle Cell Disease, Concise Clinical Review, 11: 1154-1165. (Year: 2012).*
Valeri et al., The survival, function, and hemolysis of human RBCs stored at 4 in additive solution (AS-1, AS-3, or AS-5) for 42 days and then biochemically modified, frozen, thawed, washed, and stored at 4° C. in sodium chloride and glucose solution for 24 hours, Transfusion, 40: 1341-1345. (Year: 2000).*
Deo et al., Solution properties of amitriptyline and its partitioning into lipid bilayers, Colloids and Surfaces B Biointerfaces, 24: 155-159. (Year: 2004).*
Milipore Sigma, Amitriptyline Safety Data Sheet. (Year: 2024).*
Belizaire, et al., Microparticles from Stored Red Blood Cells Activate Neutrophils and Cause Lung Injury after Hemorrhage and Resuscitation, J Am Coll Surg, 214(4): 648-657. (Year: 2012).*
Oxford Languages, "Store" definition. (Year: 2025).*
Ozayar et al., Hemodiafiltration: A Novel Approach for Treating Severe Amitriptyline Intoxication, Toxicology International, 19(3): 319-321. (Year: 2012).*
Richard S. Hoehn et al, Acid Sphingomyelinase Inhibition in Stored Erythrocytes Reduces Transfusion-Associated Lung Inflammation; Annals of Surgery, vol. 265, No. 1, Jan. 2017, pp. 218-226.
Richard S. Hoehn et al, Acid Sphingomyelinase Inhibition Prevents Hemolysis During Erythrocyte Storage; Cell Physiol Bochem 2016; 39: 331-340.
Awoojudu et al., Acid sphingomyelinase is activated in sickle cell erthyocytes and contributes to inflammatory microparticle generation in SCD, Blood, Sep. 18, 2014, 124(12):1941-1950 (Year: 2014).
Jilani et al., Fluoxetine Induced Suicidal Erthrocyte Death, Toxins 2013, 5, 1230-1245 (Year: 2013).
Kornhuber et al., Identification of New Functional Inhibitors of Acid Sphingomyelinase Using a Structure-Property-Activity Relation Model, J. Med. Chem. 2008, 51, 219-237 (Year: 2008).
Hoehn et al., Molecular mechanisms of erythrocyte aging, Biol Chem. Jun. 2015; 396(6-7): 621-631, Published online on Mar. 29, 2015 (Year: 2015).

* cited by examiner

*Primary Examiner* — Arthur S Leonard
*Assistant Examiner* — Joseph Paul Miano
(74) *Attorney, Agent, or Firm* — DINSMORE & SHOHL LLP

(57) ABSTRACT

Methods, additive kits and storage compositions for decreasing the deleterious effects of storage on pRBCs, for improving the aging process of stored pRBCs, and for preventing or ameliorating patient comorbidities following the transfusion or infusion of stored blood based on inhibiting acid sphingomyelinase during storage are provided.

16 Claims, 18 Drawing Sheets

RED BLOOD CELL STORAGE SOLUTIONS, SOLUTION ADDITIVES, AND METHODS FOR IMPROVING THE STORAGE OF RED BLOOD CELLS

PRIORITY CLAM

This application is a divisional of U.S. application Ser. No. 15/490,068, filed on Apr. 18, 2017 and claims priority under 35 U.S.C. § 119(e) to U.S. Provisional application Ser. No. 62/323,837, filed on Apr. 18, 2016, the entire disclosures of which are incorporated herein.

GOVERNMENT LICENSE RIGHTS

This invention was made with government support under R01 GM107625 awarded by the National Institute of General Medical Sciences of the US National Institutes of Health. The government has certain rights in the invention.

BACKGROUND

Hemorrhagic shock is the most common cause of preventable death in traumatically injured patients and transfusion of human blood products, including stored/packed red blood cell units (pRBCs), is the ideal treatment for hemorrhagic shock in the acute setting. Unfortunately, this use of blood products may result in later harm to the patient. Liberal transfusion strategies, with use of pRBCs to treat anemia, have been associated with poor clinical outcomes and increased mortality in critically ill patients, an effect that is thought to be related, at least in part, to age of pRBCs. Compared to fresh units, transfusion of aged pRBCs has been associated with increased rates of pneumonia, sepsis, multi-organ failure, and mortality.

Standard blood banking inventory management relies on a first in, first out system whereby the oldest viable pRBC units are often used first. Thus, the average age of transfused pRBCs ranges from 20-30 or more days. As the life span of erythrocytes in the circulating system is 120 days, patients receiving pRBC transfusion at the end of the current FDA shelf life of 42 days of storage may be exposed to erythrocytes that range in age from 42 to 162 days in chronological age. As pRBCs age, they develop changes in biochemical and molecular parameters known as the red blood cell or erythrocyte "storage lesion". Erythrocyte structural proteins, lipids, and carbohydrates undergo oxidative injury which leads to cross-linking of erythrocyte membrane phospholipids and proteins. Alterations in membrane structural components, including the spectrin-actin-protein 4.1 complex and band 3, result in loss of membrane domain as well as the classic erythrocyte biconcave disc shape, with subsequent appearance of echinocytes and spherocytes as well as a loss of normal deformability. Phosphatidylserine, normally on the intracellular side of the plasma membrane, becomes externalized. These membrane changes and increased fragility contribute to increased acidosis and hemolysis observed during the storage of pRBCs, as well as decreased erythrocyte survival following transfusion.

During storage, pRBCs also generate microparticles (MPs). Aged pRBCs cause increased lung microvascular permeability and neutrophil migration compared to fresh pRBCs which may be due to MP accumulation in aged blood. In mouse and rat models, washing aged pRBCs to remove MPs prior to transfusion has been shown to diminish lung injury. Transfusion of aged pRBCs has also been clinically associated with increased incidence of deep vein thrombosis. Elevated levels of erythrocyte-derived MPs in patients have been associated with increased thrombin formation and complement activation. MPs from aged pRBCs have been shown in vitro to induce thrombin generation, potentially due to increased phosphatidylserine expression or interactions with factor XII.

Under normal flow conditions, erythrocytes, usually 6-9 μm in diameter, are able to flex their discoid shape in order to squeeze through capillary vessels that are only 3-6 μm wide. The decreased deformability of aged erythrocytes leads to reduced capillary flow, decreased oxygen delivery to tissues, and impaired survival of transfused erythrocytes. Aged erythrocytes have also been shown to have increased adhesion to endothelial cells, likely due to the increased phosphatidylserine on the external erythrocyte membrane.

Increased free-hemoglobin in stored pRBCs further exacerbates this microangiopathy by scavenging nitric oxide (NO), which is generated by endothelial cells and helps control blood flow by inducing relaxation of vascular smooth muscle. As a result, transfusion of pRBCs with age-related hemolysis impedes endothelial-dependent vasodilation and end organ perfusion, which may have a significant a clinical impact. Decreased cerebral perfusion may be a reason that cardiac surgery patients receiving older pRBCs are at an increased risk for post-operative delirium. In a rat models, transfusion of aged pRBCs has negative effects on liver perfusion and necrosis, and leads to acute hypertension, vascular injury, and kidney dysfunction. Similarly, it has been demonstrated that an increase in pulmonary artery pressure following transfusion of old blood was mitigated with inhaled NO. Given that one pRBC contains 220-250 mg of iron, transfusion recipients must rapidly clear greater than 50 mg of iron per pRBC transfused. Following transfusion, iron deposition is visibly evident in the liver, spleen, and kidney. Clinical studies have correlated age of pRBCs transfused, as well as number of units transfused, with infectious complications. Preventing hemolysis in stored pRBCs would offer significant benefit to transfusion recipients.

Sphingolipids, including ceramide, are essential cell membrane components and play an important role in cell signaling. Sphingolipid metabolism appears to play an important role in many of the erythrocyte structural changes that may occur during aging. Incubation of erythrocytes with varying doses of sphingomyelinase results in ceramide-enriched platforms, phosphatidylserine exposure, band 3 changes, and CD59 clustering. These changes led to decreased cell size, increased cell fragility, and MP formation. Sphingolipids have also been implicated in membrane changes that occur in sickle cell disease and Gaucher disease, and ceramides have been suggested to form pores in erythrocyte membranes. Ceramide accumulation has also been tied to eryptosis, or suicidal erythrocyte death. Finally, mass spectrometry studies have shown phospholipid interactions to be involved in the membrane budding process that drives MP formation.

Clearly there remains a compelling need in the transfusion arts for improved RBC storage compositions formulated to improve the preservation of RBCs and which result in increased storage duration, reduced storage lesion and improved clinical outcome subsequent to transfusion or infusion.

SUMMARY

Accordingly, the present disclosure provide additives, solutions and methods for the improved storage of pRBCs by functionally inhibiting the enzyme acid sphingomyelinase (Asm), which converts sphingosine to ceramide on the cell membrane. A non-limiting list of functional Asm inhibitors is set forth in Table 1. Combinations of Asm-inhibiting agents are also contemplated.

According to one embodiment, a packed red blood cell (pRBC) storage solution is provided comprising one or more acid sphingomyelinase (Asm) inhibitors. Other embodiments are directed to additive kits for formulating a pRBC storage solution comprising at least one Asm inhibitor.

Another embodiment is provides methods for preserving red blood cells comprising packing the red blood cells in a storage solution comprising at least one Asm inhibitor. Embodiments directed to methods for mitigating complications associated with a transfusion or infusion of red blood cells comprising storing the red blood cells in a storage solution comprising at least one Asm inhibitor are also provided.

These and other embodiments and aspects of the invention will be more fully understood and clarified by reference to the Brief Description of the Figures, and Detail Description with Examples set forth herein.

DETAILED DESCRIPTION

Figure 1:
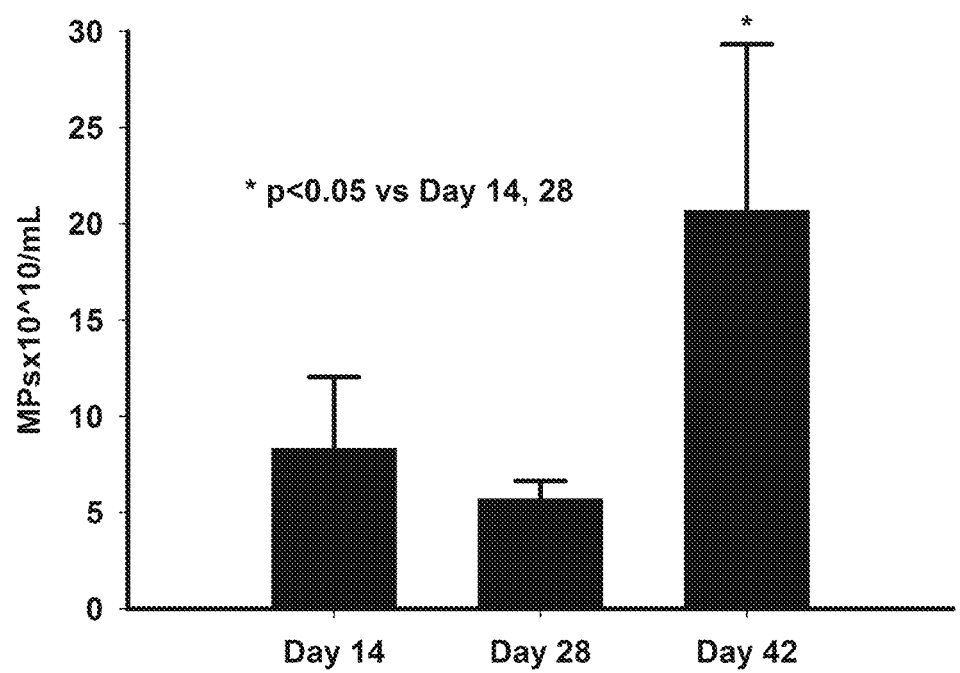
FIG. 1) Bar graph showing microparticle counts in human pRBCs at days 14, 28, and 42 of storage, as determined by Nanoparticle Tracking Analysis.

Generally, when whole blood is collected, it is separated into components and the red blood cell (RBC) fraction is stored as packed RBC's (pRBCs). Typically, RBCs are packed by centrifugation, and plasma is removed so that RBCs make up about 80 of the volume. The storage solution is added to the pRBC. As erythrocytes age in storage, they demonstrate several age-related changes including MP formation, hemolysis, decreased cell size and complexity, externalization of phosphatidylserine, and loss of band 3 protein.

Sphingolipids are a class of lipids containing a backbone of sphingoid bases. They play diverse roles in cellular processes and are significant components of cell membranes. Sphingomyelin (SM), which comprises 10% of the mammalian plasma membrane, is degraded by the hydrolyzing enzyme sphingomyelinase (SMase). In recent studies, membrane curvature and associated increases in mechanical bending stresses in RBCs, activated SMase, thereby reducing SM and increasing ceramide. Production of ceramide has a direct effect on a wide range of cellular processes and alters production of other immediately descendent metabolites such as sphingosine and sphingosine 1-phosphate (S1P), which are key regulators of inflammation. Furthermore, SMase has been implicated in lipid microdomain formation, membrane fragility, vesiculation, and MP formation.

Amitriptyline is a tricyclic antidepressant (TCA) that was initially introduced by Merck in 1961 for the treatment of major depressive disorder and is widely used in the clinic to treat a number of other disorders as well as neuropathic pain. In the 1970s the ability of tricyclic antidepressants to inhibit acid sphingomyelinase (Asm) was discovered. The enzyme Asm catalyzes the hydrolysis of sphingomyelin to ceramide. Asm and ceramide were shown to play a crucial role in a wide range of diseases, including cancer, cystic fibrosis, diabetes, Alzheimer's disease, and major depression, as well as viral (e.g., measles virus) and bacterial (e.g., Staphylococcus aureus, Pseudomonas aeruginosa) infections. Ceramide molecules may act in these diseases by the alteration of membrane biophysics, the self-association of ceramide molecules within the cell membrane and the ultimate formation of larger ceramide-enriched membrane domains/platforms. These domains were shown to serve the clustering of certain receptors such as CD95 and may also act in the above named diseases. Amitriptyline is known as a functional inhibitor of acid sphingomyelinase. The enzyme resides in the lysosome and is usually attached to the inner membrane leaflet by electrostatic forces. Membrane-bound ASM is active and degrades sphingomyelin, yielding ceramide.

Weak bases such as Amitriptyline passively diffuse across membranes in their neutral state. In acidic intracellular compartments like the lysosome, they become protonated. In this state, they can no longer cross the membrane and thus are trapped inside of the compartment. The accumulation of antidepressants in acidic compartments has been demonstrated experimentally. The accumulation of antidepressants like Amitriptyline or Desipramine in a lysosome interferes with the binding of ASM to the membrane, resulting in detachment of ASM and subsequent inactivation by proteolytic degradation.

Weak basicity and high lipophilicity are physicochemical properties Amitriptyline shares with other functional inhibitors of acid sphingomyelinase. These characteristics, rather than specific structural motives, appear to be the prerequisites for Asm inhibition by these drugs. Cell culture-based experiments have identified the compounds set forth in Table 1 as functional inhibitors of Asm(s). The relevant experiments used the human cell line H4. The Asm activity was measured using a radiolabel assay. (See, Kornhuber et al. "Identification of novel functional inhibitors of acid spingomyelinase" PLoS ONE (2011) 6(8), the entire disclosure of which is incorporated herein by this reference.) According to the "Kornhuber chemo-informatic prediction model", in the absence of experimental data, identification of functional inhibitors of Asm based on certain molecular properties is nonetheless possible with a high degree of reliability.

As illustrated in the examples, many of the deleterious storage-related changes in RBCs are reduced by treatment of pRBCs with a functional Asm inhibitor. The solutions, methods and kits of the instant invention are exemplified by Amitriptyline (AT) and Fluoxetine (FT), however any functional inhibitor of Asm may be suitable with a reasonable degree of success, based on the Kornhuber chemo-informatic model (see also, e.g. Kornhuber, J. et al. (2008) "Identification of new functional inhibitors of acid sphingomyelinase using a structure-property-activity relation model" *J Med Chem.* 51: 219-237, the entire disclosure of which is incorporated herein by this reference). As shown below in the examples, AT treatment during storage reduced MP-rich serum in aged pRBCs. Ceramide accumulation is known to affect erythrocyte degradation, and by inhibiting this sphingolipid pathway, many of the age-related changes that occur during storage of pRBCs are prevented. As a result, much of the lung inflammation that is associated with transfusion of aged pRBCs is reduced. Similar results were produced when studying blood from $Asm^{-/-}$ mice.

One embodiment of the invention provides a packed red blood cell (pRBC) storage solution comprising one or more acid sphingomyelinase (Asm) inhibitors. Suitable specific Asm inhibitors include functional Asm inhibitors, exemplified by Table 1 without limitation. Suitable specific inhibitors may also be identified by the Kornhuber chemo-informatics model and employed in the disclosed compositions, methods and kits with a reasonable expectation of success. According to very specific embodiments, at least one Asm inhibitor is selected from Amitriptyline, Fluoxetine, and combinations thereof. The solution may comprise an AS-3 solution.

Method embodiments for preserving red blood cells are also provided. The methods comprise packing the red blood cells in a storage solution comprising at least one Asm inhibitor. In some embodiments, the Asm inhibitor may be removed by filtration or other suitable means prior to transfusion/infusion into a patient. In specific embodiments, the Asm inhibitor comprises at least one Asm inhibitor set forth in Table 1. In more specific embodiments, the Asm inhibitor comprises at least one functional inhibitor of Asm, and in very specific embodiments the Asm inhibitor Amitriptyline, Fluoxetine, or both.

Other embodiments are directed to methods for mitigating a complication associated with a transfusion or infusion of red blood cells, the method comprising storing the red blood cells in a storage solution comprising at least one Asm inhibitor. According to specific embodiments, the complication comprises lung inflammation. Suitable Asm inhibitors are listed in Table 1, however as noted above, all functional Asm inhibitors may be predicted to provide a benefit to reducing the deleterious effects of storage on pRBCs. In very specific embodiments, the Asm inhibitor comprises Amitriptyline or Fluoxetine or both.

Kit embodiments are also contemplated. Kits comprise at least one Asm inhibitor as an additive for formulating a pRBC storage solution. Suitable specific Asm inhibitors are exemplified by Table 1, without limitation, or may identified by reference to the Kornhuber chemo-predictive model. In specific embodiments the functional Asm inhibitor comprises Amitriptyline or Fluoxetine or both.

Broadly, methods for improving the aging process of stored pRBCs and preventing or ameliorating patient comorbidities following the transfusion of stored blood are provided. Further embodiments are directed to treating subjects in need of a blood transfusion or infusion with red blood cells stored in accordance with the novel storage compositions disclosed herein, or treated with one or more Asm inhibitors. In some embodiments, the Asm inhibitor may be removed from the blood product prior to transfusion or infusion into the subject, for example by filtration or capture means.

The following Examples illustrate particular aspects and features of the invention disclosed herein and should not be taken as limiting the full scope of the invention as defined by the appended claims.

EXAMPLES

The following materials and methods apply to the Examples set forth herein.

Animal Model

Male C57BL/6 mice aged 8-10 weeks were purchased from Jackson Laboratories, fed standard laboratory diet and water ad libitum, and acclimated for 1 week in climate-controlled conditions with 12 hours light-dark cycles prior to use. Asm-deficient mice ($Asm^{-/-}$) on a C57BL/6 background were used and compared to syngenic C57Bl/6 wild type mice as controls. All experiments were approved by the Institutional Animal Care and Use Committee at the University of Cincinnati.

Blood Banking and Treatment

Human pRBCs were obtained from Hoxworth Blood Bank (Cincinnati, OH) and stored at 4° C. for 42 days according to standard blood banking practice. Murine pRBCs were obtained as previously described. Briefly, donor mice were anesthetized with intraperitoneal pentobarbital (0.1 mg/g body weight) and blood was collected via cardiac puncture into CP2D anticoagulant-coated syringes. CP2D was then added to the whole blood in a 1:7 ratio and gently mixed. Whole blood was centrifuged at 1,000 g for 10 minutes at 4° C. and platelet-rich plasma was discarded.

Storage solution (AS-3) was added to erythrocytes in a 2:9 ratio using the original whole blood volume. Units were stored at 4° C. for 14 days.

Amitriptyline (Sigma-Aldrich, St Louis, MO, USA) was dissolved in 0.9% sodium chloride and added to mouse and human pRBCs in a 1:10 dilution prior to storage. Except for dose-response experiments, AT treatment refers to a 125 µM concentration of AT in pRBCs.

Blood Component Isolation

Erythrocytes were pelleted from pRBC samples at 2,000 g for 10 minutes at 4° C. The supernatant from this spin was then centrifuged at 10,000 g for 10 minutes at 4° C. to pellet any remaining cells or platelets. The MP-rich supernatant from this second spin was used to characterize MP production and hemolysis. MPs were pelleted using a 20,000 g spin for 30 minutes at 4° C.

Erythrocyte Characterization

Hemoglobin in the MP-rich supernatant was quantified using a Coulter AcT diff Analyzer (Beckman Coulter Corp., Brea, CA). Cell size (forward scatter), complexity (side scatter), phosphatidylserine exposure (annexin V positivity), and band 3 protein integrity (eosin-5-maleimide[68]) were analyzed using an Attune flow cytometer (Life Technologies, Carlsbad, CA). Antibodies for ter119, CD235a, CD41, CD45, and Annexin V were acquired from BD Biosciences (San Diego, CA), and eosin-5-maleimide was obtained from Life Technologies (Carlsbad, CA).

Measurement of Lung Inflammation

To study the effect of AT treatment on lung inflammation following blood transfusion, mice received 200 µl IV injections of pRBCs or MPs. Lungs were taken 6 hours after transfusion for either histologic or Evans blue evaluation. Histologic lung sections were examined for evidence of lung edema with hematoxylin and inflammatory cells with anti-Gr1 antibodies (AbD Serotec, Raleigh, NC). Tight junction integrity was assessed by staining lung slides with Cy3-conjugated anti-ZO1 (Jackson ImmunoResearch, West Grove, PA). Endothelial cell permeability was assessed using the Evans blue method (source). In brief, mice were weighed and injected with 30 mg/kg Evans blue. After 10 minute of circulation time, mice were sacrificed and the pulmonary vasculature was flushed with 10 ml PBS. Lungs were dried at 55° C. for 24 hours and then incubated in 500 µl formamide for 48 hours at 55° C. Evans blue extraction calculated by measuring the optical density at 620 nm and comparing to a standard curve, and values were normalized to dry lung weight.

Example 1

Microparticle Formation

Figure 2:
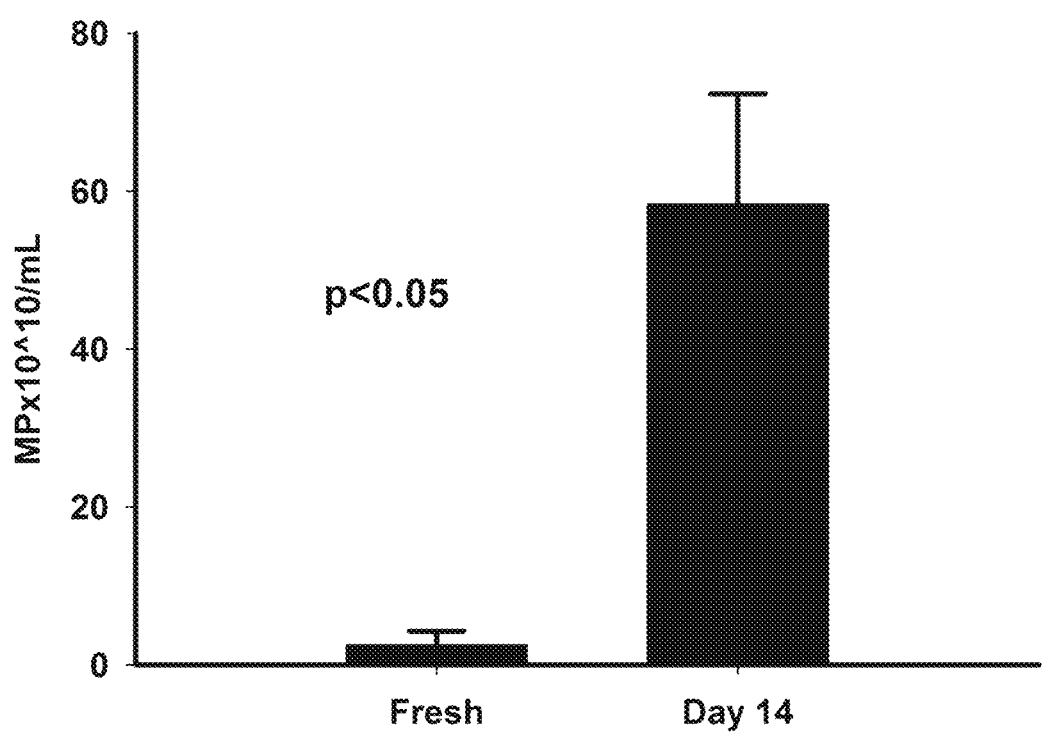
FIG. 2) Bar graph showing microparticle counts in mouse pRBCs stored for 14 days compared to fresh units, as determined by Nanoparticle Tracking Analysis.
Figure 3:
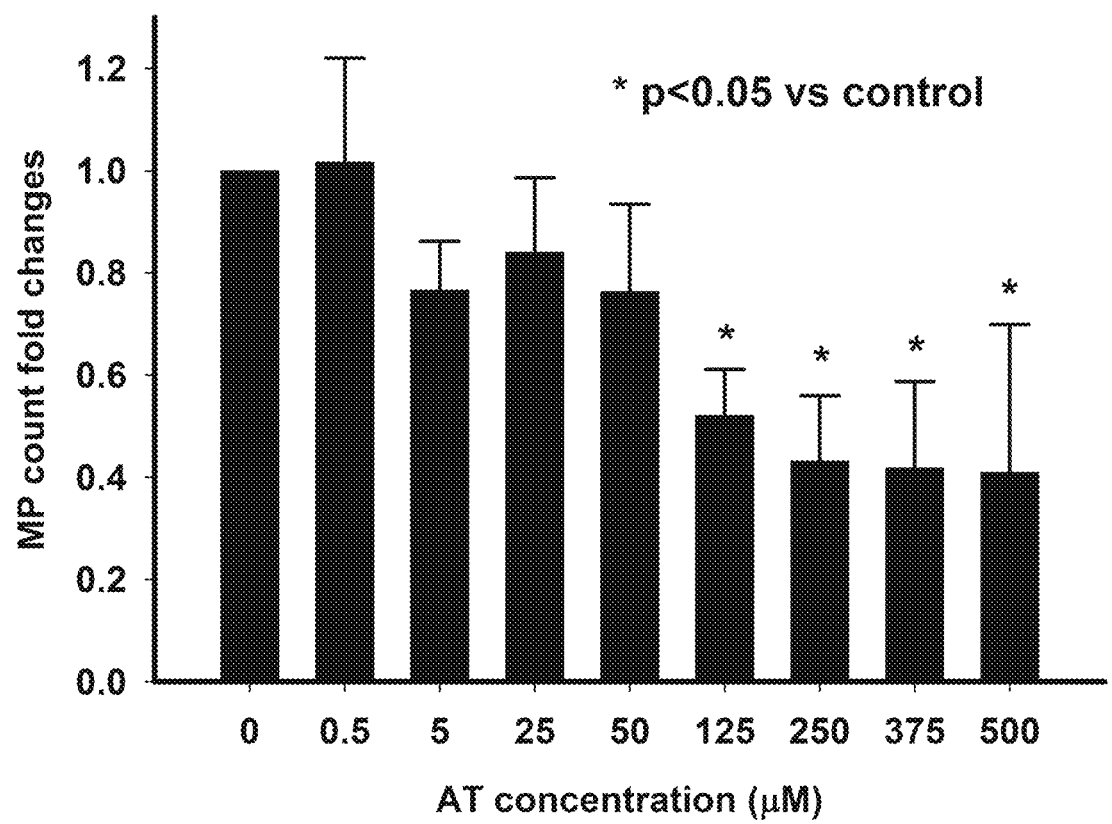
FIG. 3) Bar graph showing that Amitriptyline reduces microparticle formation in stored human pRBCs, as determined by Nanoparticle Tracking Analysis.
Figure 4:
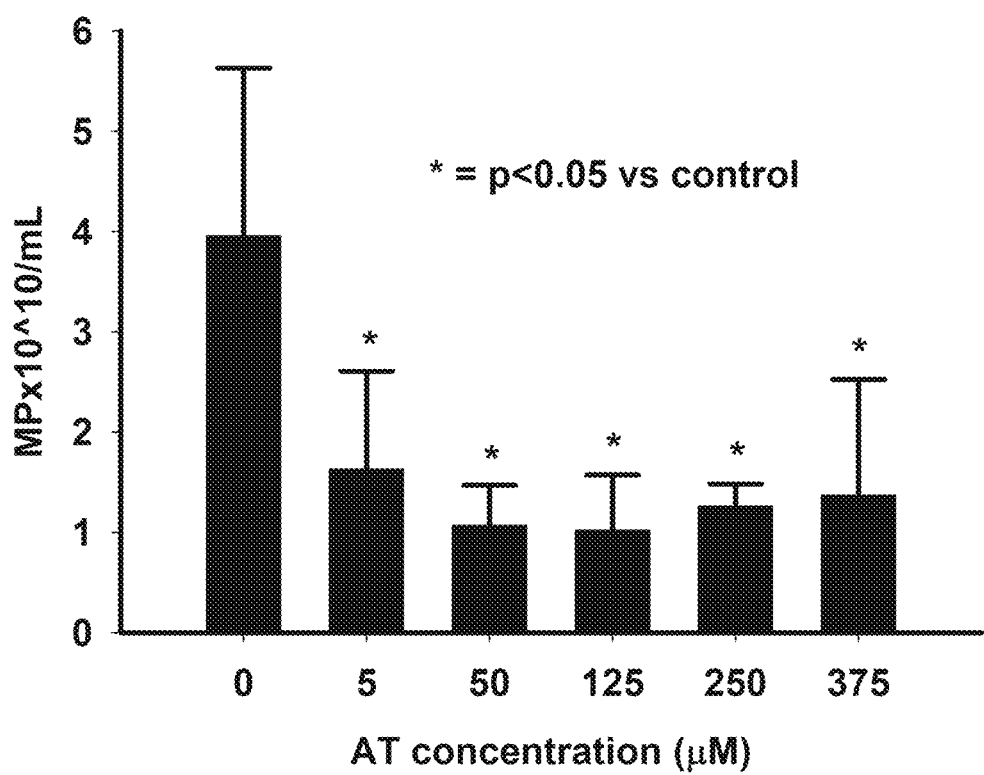
FIG. 4) Bar graph showing that Amitriptyline reduces microparticle formation in stored mouse pRBCs, as determined by Nanoparticle Tracking Analysis.
Figure 5:
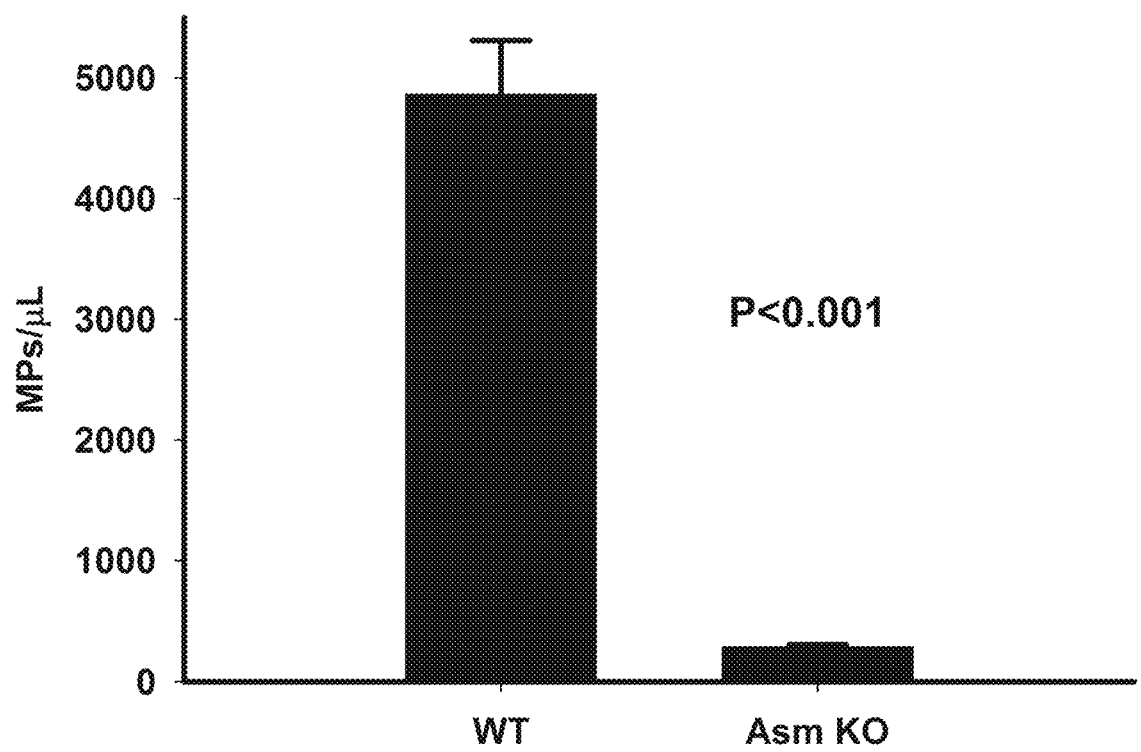
FIG. 5) Comparison bars demonstrating that pRBCs from acid sphingomyelinase-deficient mice produce less microparticles than those from wild type mice, as determined by flow cytometry.
Figure 18:
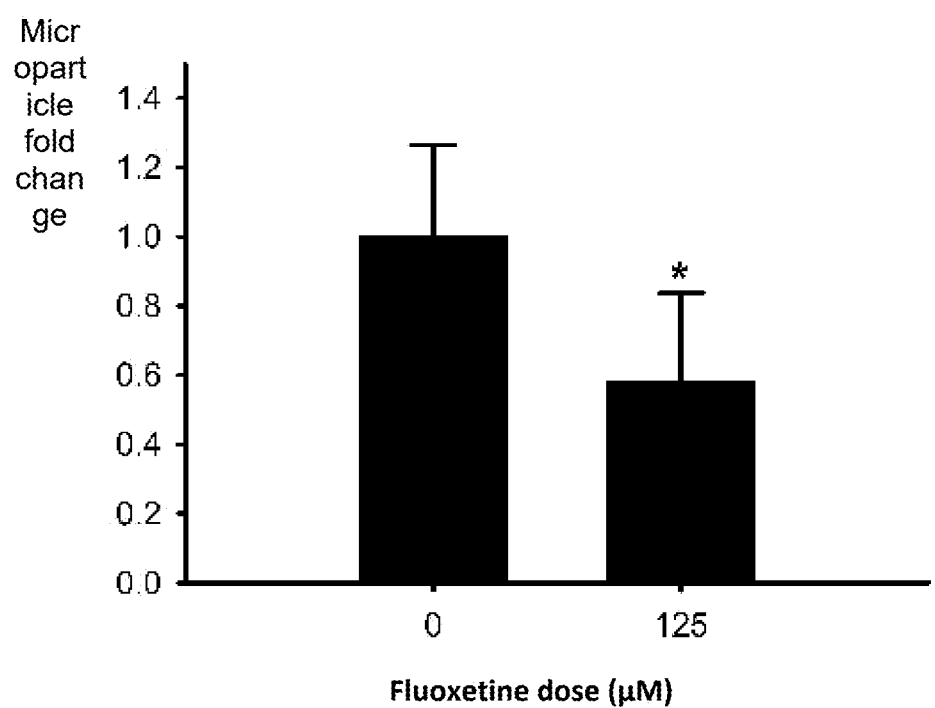
FIG. 18) Bar graph showing that Asm inhibition by Fluoxetine treatment also reduced hemolysis in murine pRBCs during storage.

Mouse and human pRBCs generate MPs during storage (FIG. 1 and FIG. 2). Treatment of pRBCs with increasing doses of AT resulted in a dose-dependent reduction of MP formation (FIG. 3 and FIG. 4). Also, analysis of pRBCs acquired from Asm$^{-/-}$ mice revealed a significant decrease in MP production (FIG. 5). In addition, treatment of pRBCs with Fluoxetine, another known functional inhibitor of Asm (FIG. 18), demonstrated a similar reduction in microparticle formation, thereby confirming that the results generalize to functional Asm inhibitors.

Example 2

Erythrocyte Stability

Figure 6:
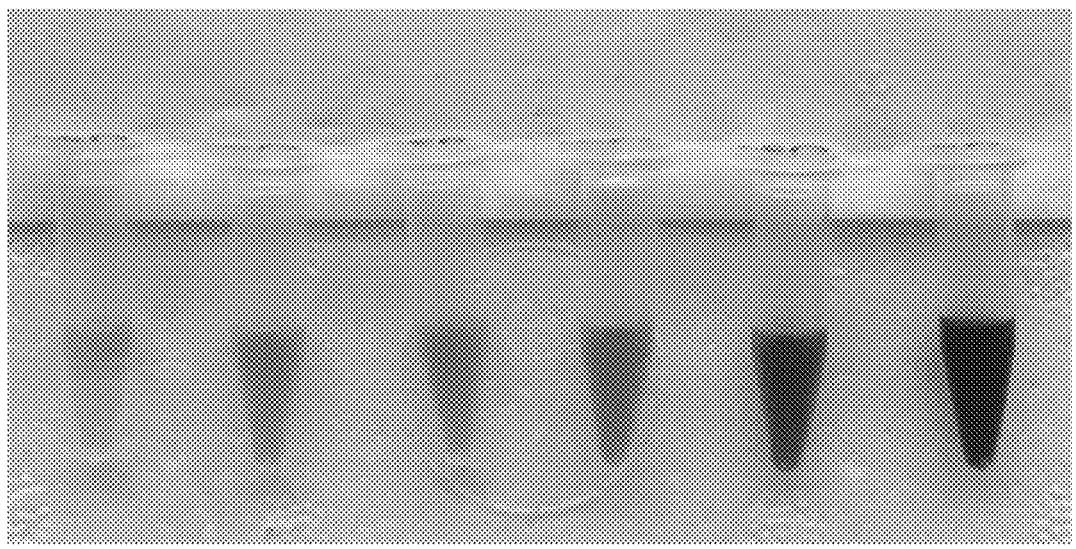
FIG. 6) Image of serum from mouse pRBCs at days 0, 3, 6, 9, 12, and 14, displaying increased cell-free hemoglobin over time.
Figure 7:
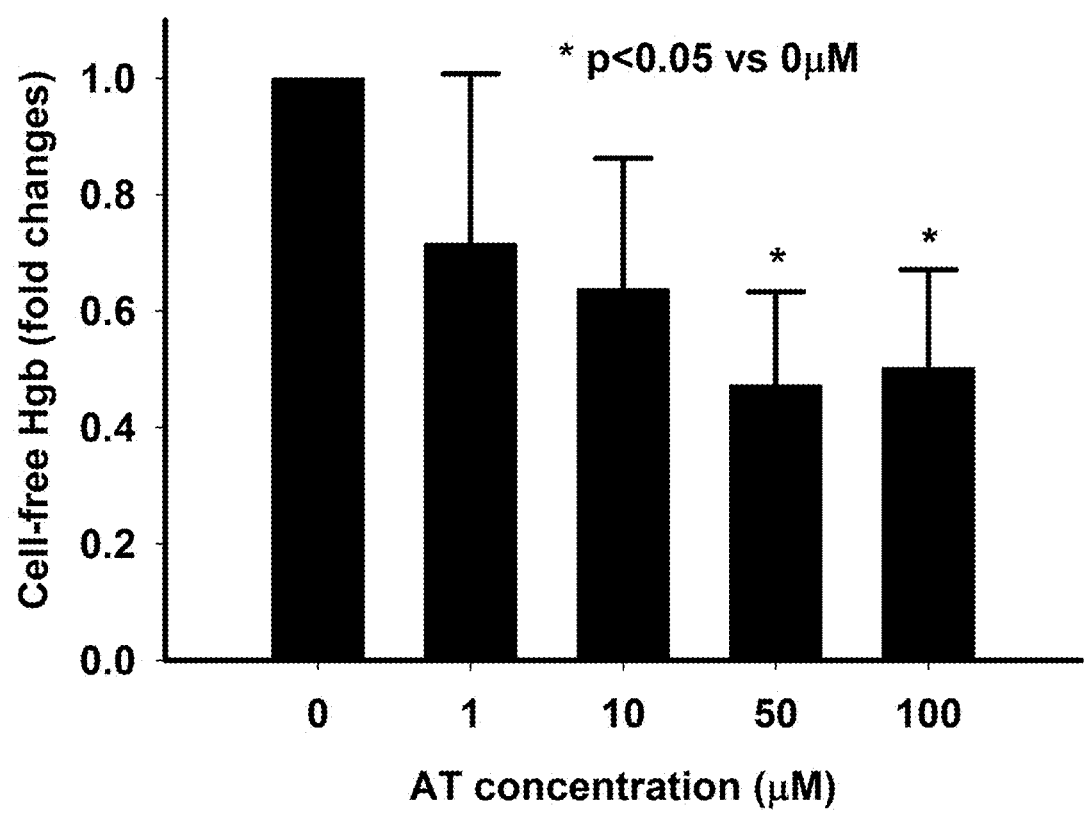
FIG. 7) Cell-free Hgb as a function of Amitriptyline (AT) concentration showing reduction of hemolysis in stored human pRBCs.
Figure 8:
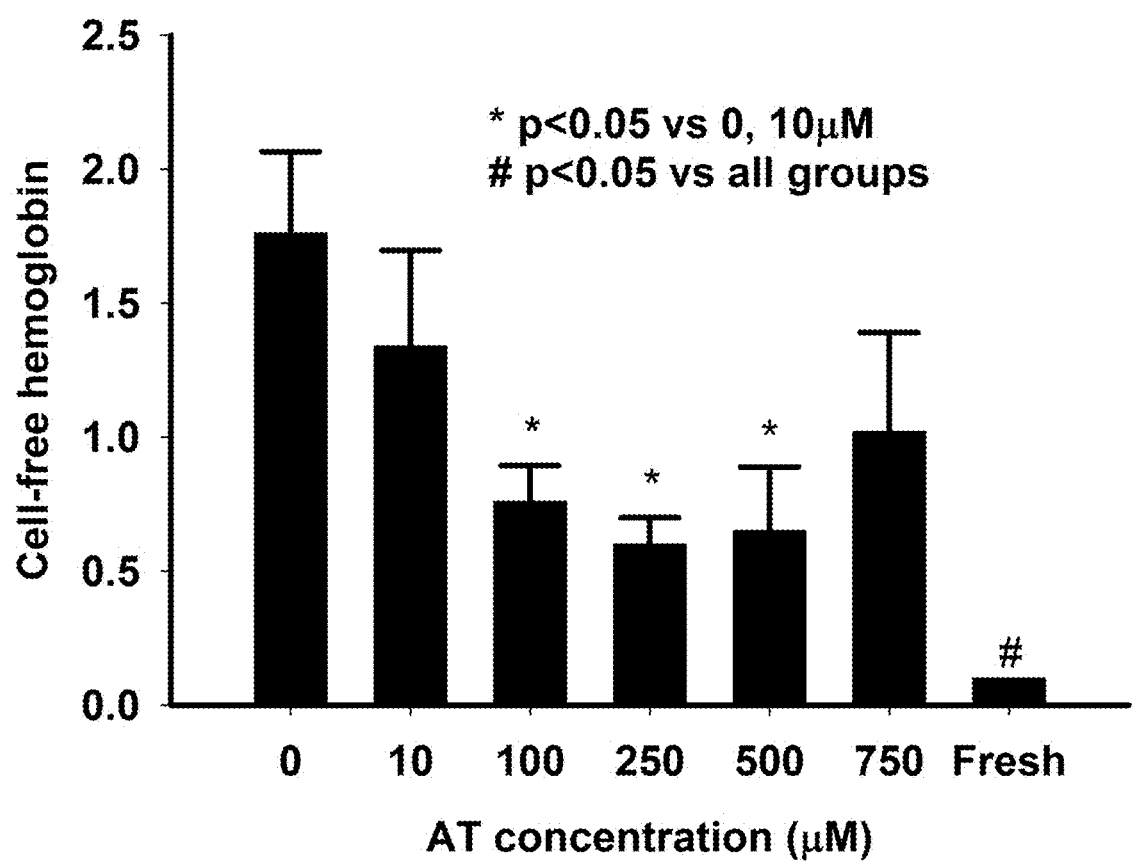
FIG. 8) Cell-free Hgb as a function of AT concentration showing reduction of hemolysis in stored mouse pRBCs.
Figure 9:
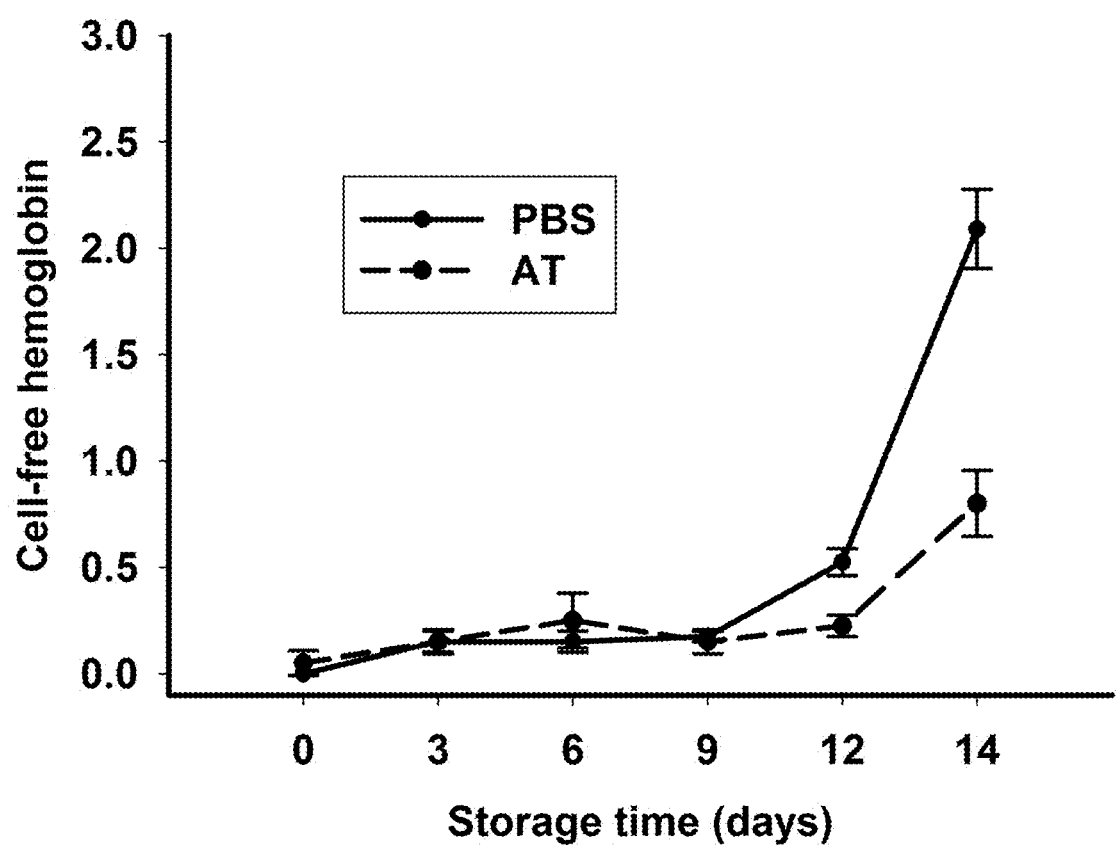
FIG. 9) Cell-free Hgb stored in AT versus PBS as a function of storage time showing reduction in hemolysis with AT additive over time in mouse pRBCs.
Figure 10:
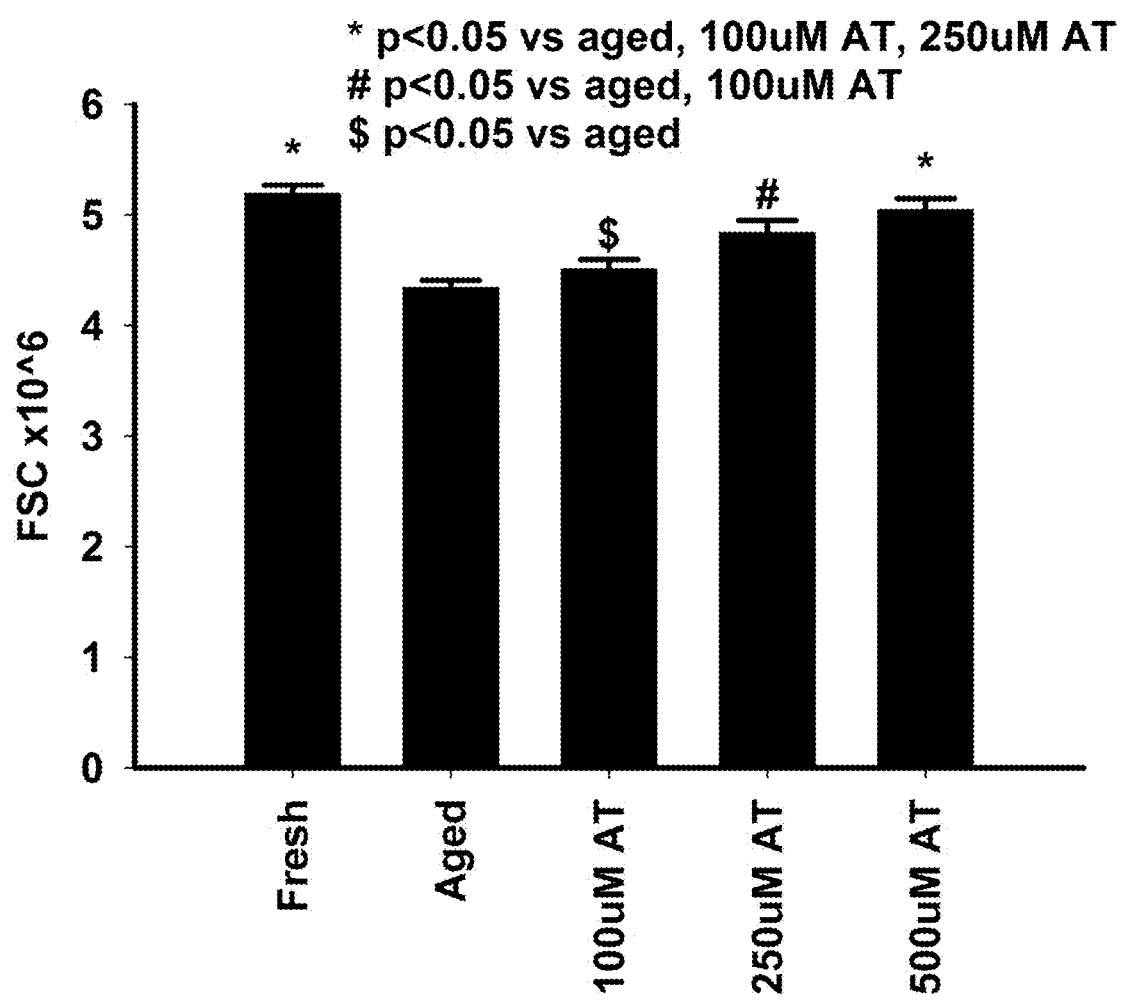
FIG. 10) Bar graph showing that maintenance of stored mouse pRBC size increases as a function of AT concentration.
Figure 11:
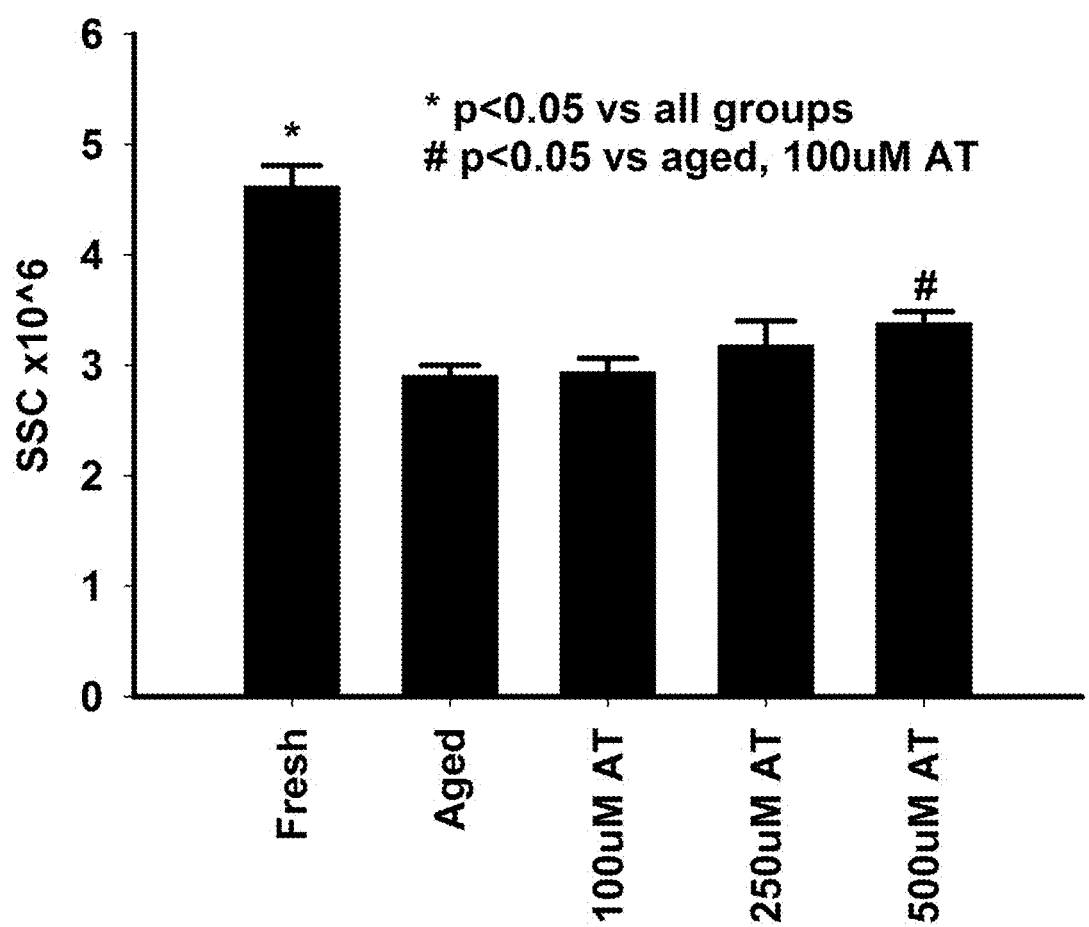
FIG. 11) Bar graph showing that maintenance of stored mouse erythrocyte complexity increases as a function of AT concentration.

During storage, erythrocytes experience age-related hemolysis, as measured by increased cell-free hemoglobin in pRBCs (FIG. 6). AT treatment resulted in a dose-dependent reduction in hemolysis in human and mouse pRBCs (FIG. 7, FIG. 8, and FIG. 9). Moreover, while aged erythrocytes demonstrate decreased cell size and complexity, these changes were mitigated with AT (FIG. 10 and FIG. 11).

Figure 12:
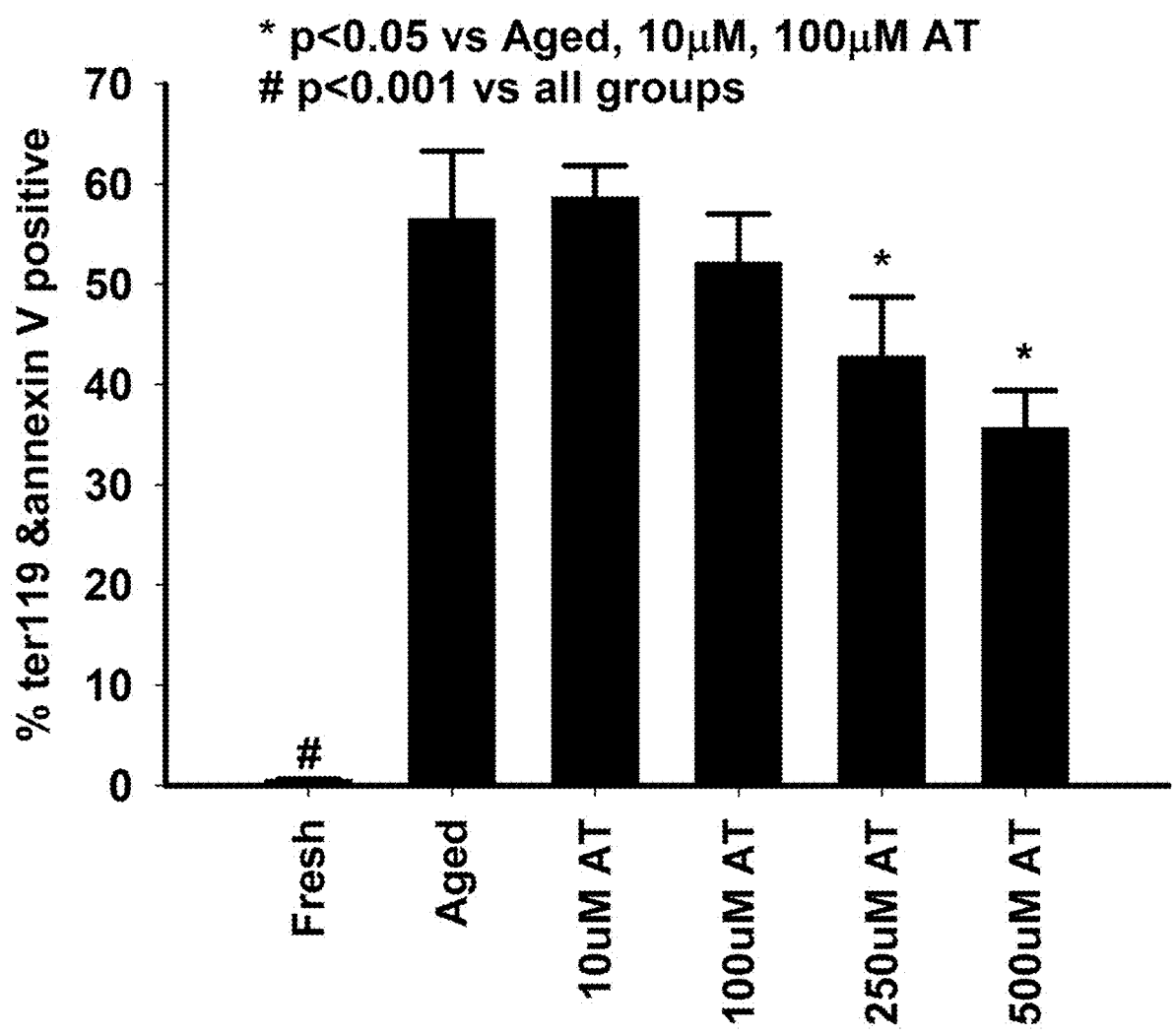
FIG. 12) Bar graph showing that AT dose-dependently prevents phosphatidylserine externalization in aged mouse erythrocytes.
Figure 13:
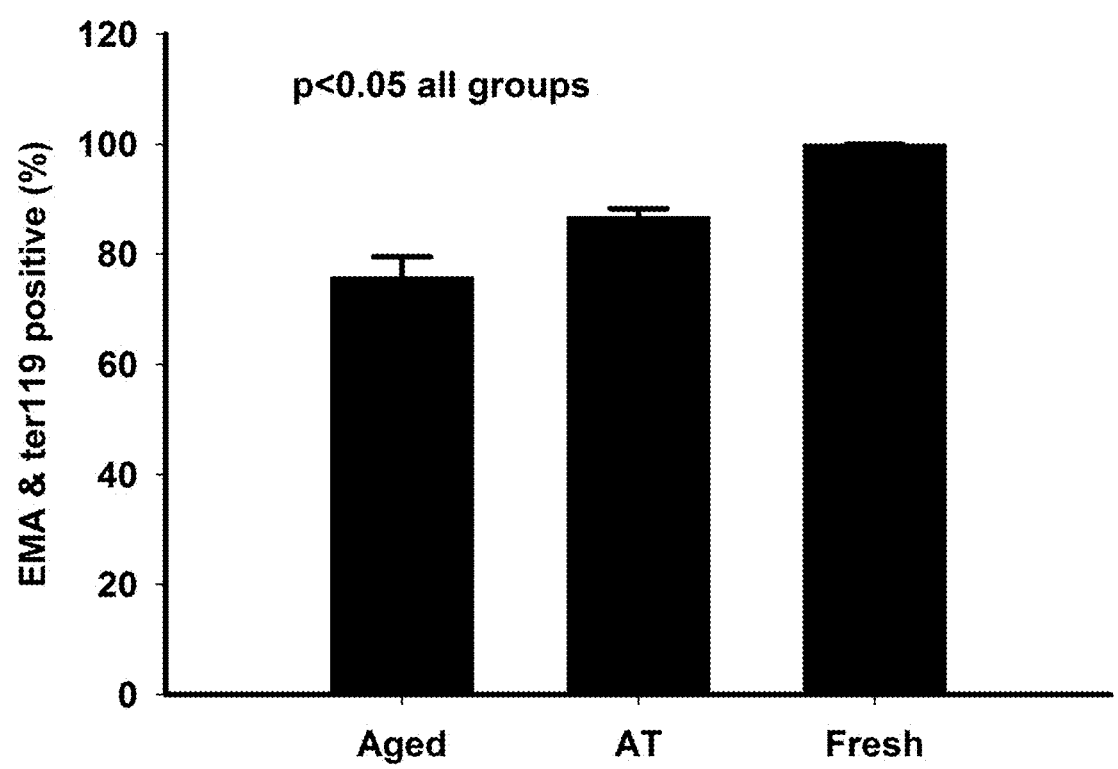
FIG. 13) Bar graph showing that AT maintains band 3 protein integrity in stored mouse erythrocytes.

As erythrocytes age in storage they are unable to maintain their membrane asymmetry and subsequently expose phosphatidylserine, usually on the inner plasma membrane, on their extracellular surface. AT treatment reduced this age-related phosphatidylserine expression in a dose dependent manner (FIG. 12). Also, while aged erythrocytes experience a degradation of band 3, a key structural protein, AT reduced this degradation by close to 50% (FIG. 13).

Example 3

Effect on Lung Inflammation

Figure 14:
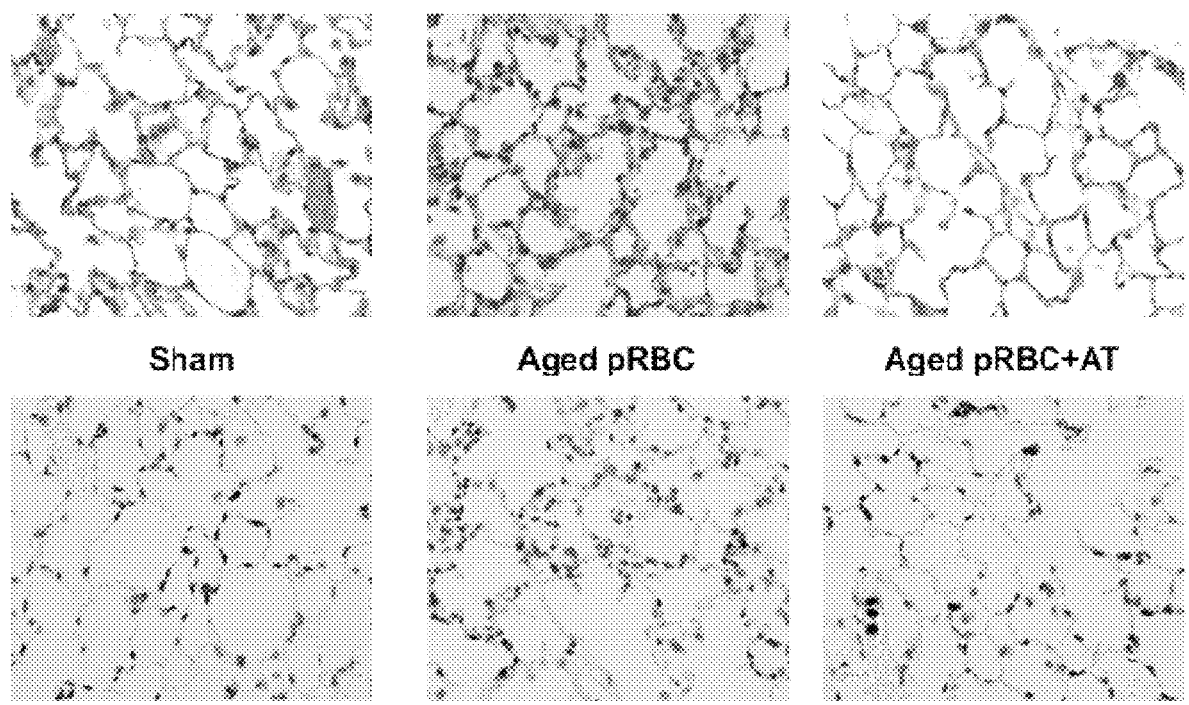
FIG. 14) Micrographs of lung cells showing that transfusion of pRBCs treated with amitriptyline causes significantly less lung edema and inflammatory cell recruitment in a murine model.
Figure 15:
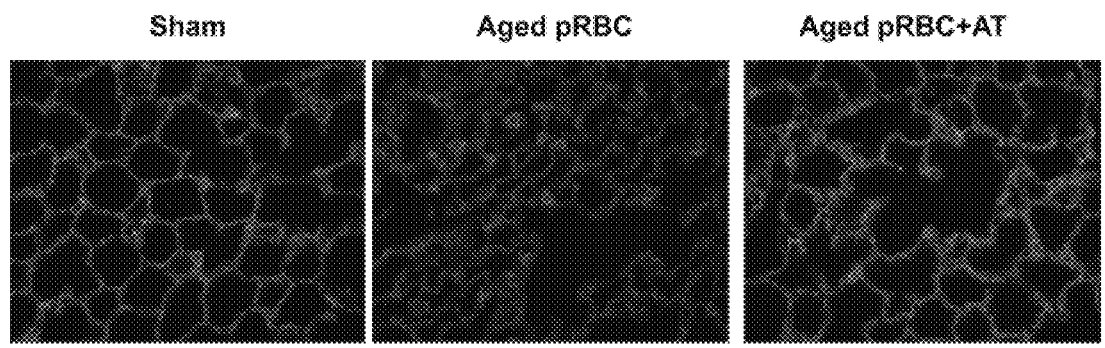
FIG. 15) Micrographs showing that transfusion of aged pRBCs results in tight junction disruption in a mouse model, which is prevented by amitriptyline treatment.
Figure 16:
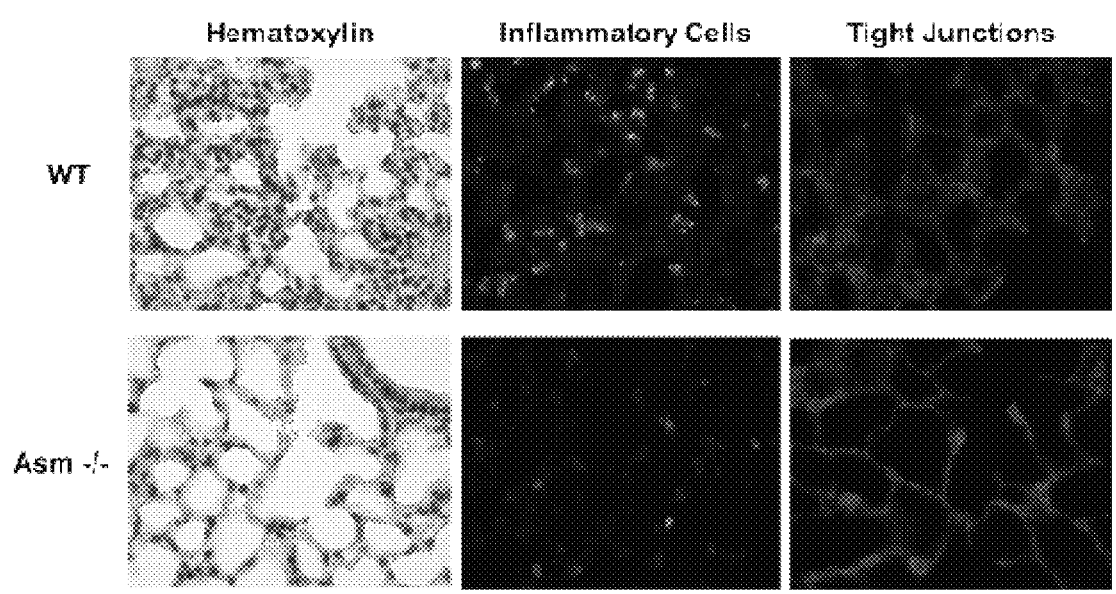
FIG. 16) Micrographs showing that transfusion of pRBCs from acid sphingomyelinase-deficient mice causes significantly less lung edema, inflammatory cell recruitment, and tight junction disruption when compared to pRBCs from wild type mice.
Figure 17:
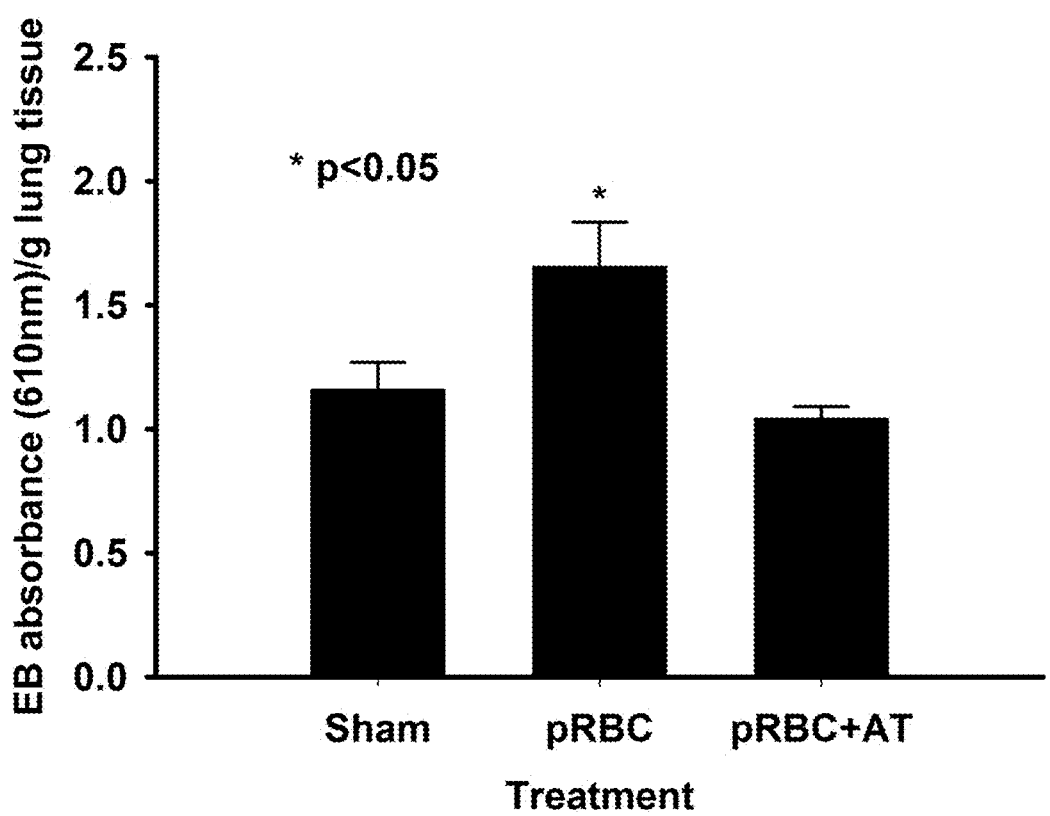
FIG. 17) Transfusion of aged pRBCs results in increased capillary leak, as measured by Bar graph showing Evans blue extravasation in the lungs is substantially prevented by treating pRBCs with amitriptyline.

Research from this lab and others has shown that transfusion of aged pRBCs as well as MPs isolated from aged pRBCs results in lung inflammation in a mouse model. Mice that receive transfusions of aged pRBCs demonstrate increased lung edema as well as inflammatory cell recruitment to the lungs. These effects are greatly reduced when mice receive pRBCs that have been treated with AT (FIG. 14). Transfusion of aged pRBCs also resulted in marked disruption of tight junctions in the lung, as indicated by histologic evaluation of ZO1. This effect was mitigated by transfusing blood that had been treated with AT (FIG. 15). Transfusion of pRBCs from Asm$^{-/-}$ mice resulted in a similar reduction in lung edema, inflammatory cell recruitment, and tight junction disruption when compared to pRBCs from wild type mice (FIG. 16). As a result, mice receiving aged pRBCs also demonstrate increased Evans blue capillary leak, an effect not seen in mice receiving pRBCs treated with AT (FIG. 17).

TABLE 1

Exemplary functional Asm inhibitors

| | | | |
|---|---|---|---|
| Alverine | Amiodarone | Amitriptyline | Amlodipine |
| Aprindine | Astemizole | AY-9944 | Benzatropine |
| Bepridil | Biperiden | Camylofin | Carvedilol |
| Cepharanthine | Chlorpromazine | Chlorprothixene | Cinnarizine |
| Clemastine | Clofazimine | Clomiphene | Clomipramine |
| Cloperastine | Conessine | Cyclobenzaprine | Cyproheptadine |
| Desipramine | Desloratadine | Dicycloverine | Dilazep |
| Dimebon | Doxepin | Drofenine | Emetine |
| Fendiline | Flunarizine | Fluoxetine | Flupentixol |
| Fluphenazine | Fluvoxamine | Hydroxyzine | Imipramine |
| Lofepramine | Loperamid | Loratadin | Maprotiline |
| Mebeverine | Mebhydrolin | Mepacrine | Mibefradil |
| Norfluoxetine | Nortriptyline | Paroxetine | Penfluridol |
| Perhexiline | Perphenazine | Pimethixene | Pimozide |
| Profenamine | Promazine | Promethazine | Protriptyline |
| Sertindole | Sertraline | Solasodine | Suloctidil |
| Tamoxifen | Terfenadine | Thioridazine | Tomatidine |
| Trifluoperazin | Triflupromazine | Trimipramine | Zolantidine |

Those skilled in the art will recognize, or be able to ascertain using no more than routine experimentation, many equivalents to the specific embodiments of the invention described herein. The scope of the present invention is not intended to be limited to the above Description, but rather is as set forth in the appended claims. It will be appreciated that the invention is in no way dependent upon particular results achieved in any specific example or with any specific embodiment. Articles such as "a", "an" and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention also includes embodiments in which more than one, or all of the group members are present in, employed in, or otherwise relevant to a given product or process. Furthermore, it is to be understood that the invention encompasses all variations, combinations, and permutations in which one or more limitations, elements, clauses, descriptive terms, etc., from one or more of the listed claims or from the description above is introduced into another claim. For example, any claim that is dependent on another claim can be modified to include one or more elements, limitations, clauses, or descriptive terms, found in any other claim that is dependent on the same base claim.

Where elements are presented as lists, it is to be understood that each subgroup of the elements is also disclosed, and any element(s) can be removed from the group. For purposes of conciseness only some of these embodiments have been specifically recited herein, but the invention includes all such embodiments. It should also be understood that, in general, where the invention, or aspects of the invention, is/are referred to as comprising particular elements, features, etc., certain embodiments of the invention or aspects of the invention consist, or consist essentially of, such elements, features, etc.

Any particular embodiment, aspect, element, feature, etc., of the present invention, or any combination thereof, may be explicitly excluded from any one or more claims whether or not such exclusion is expressly recited herein. Applicants reserve the right to proviso out of the claims any specific solution component, ingredient, ingredient category, or combination thereof, whether or not such component, ingredient or ingredient category is recited herein.

What is claimed:

1. A method for mitigating risk of a medical complication associated with transfusion of packed red blood cells to a subject in need of receiving a blood transfusion, the method comprising:
   (a) storing the packed red blood cells at 4° C. for a storage duration in a storage solution comprising:
      Additive Solution-3 (AS-3); and
      one or more acid sphingomyelinase (Asm) inhibitors at a concentration of at least 125 μM,
      whereby microparticle formation is reduced in the stored packed red blood cells;
   (b) removing the one or more Asm inhibitors from the storage solution; and
   (c) administering the stored packed red blood cells to the subject via transfusion.

2. The method according to claim 1, wherein the medical complication comprises lung inflammation.

3. The method according to claim 1, wherein the one or more Asm inhibitors is selected from the group consisting of alverine, amiodaron, amitriptyline, amlodipine, aprindine, astemizole, AY-9944, benzatropine, bepridil, biperiden, camylofin, carvedilol, cepharanthine, chlorpromazine, chlorprothixene, cinnarizine, clemastine, clofazimine, clomiphene, clomipramine, cloperastine, conessine, cyclobenzaprine, cyproheptadine, desipramine, desloratadine, dicycloverine, dilazep, dimebon, doxepin, drofenine, emetine, fendiline, flunarizine, fluoxetine, flupentixol, fluphenazine, fluvoxamine, hydroxyzine, imipramine, lofepramine, loperamid, loratadin, maprotiline, mebeverine, mebhydrolin, mepacrine, mibefradil, norfluoxetine, penfluridol, perhexiline, perphenazine, pimethixene, pimozide, profenamine, promazine, promethazine, protriptyline, sertindole, sertraline, solasodine, suloctidil, tamoxifen, terfenadine, thioridazine, tomatidine, trifluoperazin, triflupromazine, trimipramine, zolantidine, and combinations thereof.

4. The method according to claim 1, wherein the one or more Asm inhibitors comprises amitriptyline.

5. The method according to claim 4, wherein the concentration of amitriptyline in the storage solution is 125 μM.

6. The method according to claim 1, wherein the one or more Asm inhibitors comprises fluoxetine.

7. The method according to claim 1, wherein the one or more Asm inhibitors are removed from the storage solution by filtration.

8. The method according to claim 1, wherein the storage duration is up to 42 days.

9. The method according to claim 1, wherein the storage duration is at least 20 days.

10. The method according to claim 1, wherein the stored packed red blood cells have a chronological age of 42 to 162 days.

11. The method according to claim 1, wherein the concentration of the one or more Asm inhibitors in the storage solution ranges from 125 μM to 375 μM.

12. A method of reducing a risk of lung inflammation associated with transfusion of red blood cells in a subject in need of a blood transfusion, the method comprising:
   (a) providing packed red blood cells;
   (b) adding to the packed red blood cells a storage solution comprising Additive Solution-3 (AS-3) and amitriptyline at a concentration of at least 125 μM;
   (c) storing the product of step (b) at 4° C. for a storage duration to provide stored packed red blood cells;
   (d) removing the amitriptyline from the stored packed red blood cells of step (c); and
   (e) administering the stored packed red blood cells to the subject via transfusion, wherein storing the packed red blood cells in the storage solution reduces microparticle formation by the packed red blood cells, thereby reducing the risk of lung inflammation in the subject receiving the stored packed red blood cells via transfusion.

13. The method according to claim 12, wherein the concentration of the amitriptyline in the storage solution is 125 μM.

14. The method according to claim 13, wherein the storage duration is up to 42 days.

15. The method according to claim 12, wherein the amitriptyline is removed from the stored packed red blood cells of step (c) by filtration.

16. The method according to claim 12, wherein the concentration of the amitriptyline in the storage solution ranges from 125 μM to 375 μM.

* * * * *